(12) United States Patent
Herren

(10) Patent No.: US 6,948,672 B2
(45) Date of Patent: Sep. 27, 2005

(54) SPICE MILL WITH MEANS FOR INFINITELY SETTING THE GRINDING FINENESS

(75) Inventor: Bruno Herren, Hergiswil (CH)

(73) Assignee: Moha Moderne Haushaltwaren AG, Zollikofen (CH)

( * ) Notice: Subject to any disclaimer, the term of this patent is extended or adjusted under 35 U.S.C. 154(b) by 0 days.

(21) Appl. No.: 10/804,483

(22) Filed: Mar. 18, 2004

(65) Prior Publication Data

US 2004/0182958 A1 Sep. 23, 2004

(30) Foreign Application Priority Data

Mar. 20, 2003 (CH) ............................................. 0461/03

(51) Int. Cl.⁷ .......................... A01D 34/90; A47J 42/00; A47J 43/00
(52) U.S. Cl. ..................... 241/169.1; 241/168; 241/169
(58) Field of Search ............................... 241/168, 169, 241/169.1

(56) References Cited

U.S. PATENT DOCUMENTS

| | | | | |
|---|---|---|---|---|
| 3,371,874 A | * | 3/1968 | Reeves et al. ........... | 241/169.1 |
| 6,443,377 B1 | * | 9/2002 | Cheng ..................... | 241/169.1 |
| 2002/0117567 A1 | * | 8/2002 | Lee et al. ................. | 241/169.1 |
| 2004/0069881 A1 | * | 4/2004 | Arduini .................... | 241/169.1 |

* cited by examiner

Primary Examiner—Derris H. Banks
Assistant Examiner—Jason Y Pahng
(74) Attorney, Agent, or Firm—Janet Sleath; Victor N. King; Speckman Law Group PLLC

(57) ABSTRACT

The present invention provides a spice mill, in particular a pepper mill, having an improved design for setting the fineness of ground particles produced by the mill. Outer grinding teeth are located within a fixed seat. The fixed seat is connected to a rotating seat by means of a convex annular bead and a concave annular groove, thereby preventing movement of the rotating seat away from the fixed seat when the rotating seat is rotated in order to set the fineness of the ground particles. Inner grinding teeth are positioned within the outer grinding teeth and supported by a lift seat. Spokes on the lift seat are positioned within guide grooves located on the inner wall of the fixed seat whereby, on rotation of the rotating seat, the lift seat is moved upward or downward and the inner grinding teeth are shifted upwards or downwards, thereby setting the size and the fineness of the ground particles produced by the mill.

4 Claims, 4 Drawing Sheets

US 6,948,672 B2

SPICE MILL WITH MEANS FOR INFINITELY SETTING THE GRINDING FINENESS

CLAIM FOR FOREIGN PRIORITY UNDER 37 U.S.C. § 119

This application claims foreign priority to Swiss Patent Application No. 0461/03, filed Mar. 20, 2003.

1. Technical Field of the Invention

The invention relates to a spice mill. More specifically, the invention relates to a spice mill which may be adjusted in order to set the fineness of the ground particles.

2. Background of the Invention

A conventional pepper mill is shown in section in FIG. 4. It consists of a hollow body, which at its lower side comprises a grinding device 20, wherein the grinding device consists of inner and outer grinding teeth 201, 202. A connection rod 30 passes through the inner grinding teeth 201. The upper and lower ends of the connection rod 30 project out of an upper terminal cap 40 and out of the inner grinding teeth 201, respectively, with the upper terminal cap 40 and inner grinding teeth 201 being incorporated in the hollow body 10. The ends of connection rod 30 are fastened by tightening the nuts 301 and 302, so that on rotation of the upper terminal cap 40 the connection rods are co-rotated and the inner grinding teeth 201 likewise rotate, whereby the pepper grains are ground.

The size and the fineness of the ground pepper grains may be set by screwing in and out the nut 302, which is located at the lower end of the connection rod 30. This results in the movement of the inner grinding teeth upwards and downwards, which in turn allows the play between the inner 201 and outer 202 grinding teeth to be set, thereby setting the fineness of the ground particles.

Since, however, the nut 302 is not fastened on the connection rod with a rigid abutment, it is possible, in the case of incorrect handling, for the nut 302 to fall out during use. This may also occur during rotation of the upper terminal cap for grinding the pepper grains, and, in the worst case, as a result of this the nut 302 may fall into the food to be spiced, for example soup.

The setting of the degree of fineness by manipulating the nut 302, which has to be small, is furthermore impractical and requires significant manual skill, which can be problematic, for example, for older persons. In addition, the nut 302 is dirtied with particles of the product to be ground with each grinding procedure and an adjustment of the grinding fineness is not possible without the user getting dirty fingers.

It is therefore the object of the present invention to provide a mill which overcomes these disadvantages.

SUMMARY OF THE INVENTION

The present invention provides a spice mill, in particular a pepper mill, having an improved design for setting the fineness of ground particles produced by the mill. The inventive mill includes outer grinding teeth positioned in a circular arrangement and rigidly located within a fixed seat. A rotating seat is provided which can be engaged from the outside of the mill and rotated in order to set the fineness of the ground particles. The fixed seat is connected to the rotating seat by means of a convex annular bead and a concave annular groove, which prevent movement of the rotating seat away from the fixed seat during rotation. Inner grinding teeth are moveably positioned within an inner circumference of the outer grinding teeth and are supported by a lift seat, which is connected to the rotating seat by means of threaded peg which may be screwed into a threaded bore provided on the rotating seat. Spokes on the lift seat are engaged in vertical guide grooves located on the inner wall of the fixed seat whereby, on rotation of the rotating seat, the lift seat is moved upward or downward and the inner grinding teeth are shifted upwards or downwards, thereby setting the size and the fineness of the ground particles produced by the mill.

BRIEF DESCRIPTION OF THE DRAWINGS

The spice mill according to the present invention is hereinafter described in combination with the drawings, wherein.

DETAILED DESCRIPTION OF THE INVENTION

Figure 1:
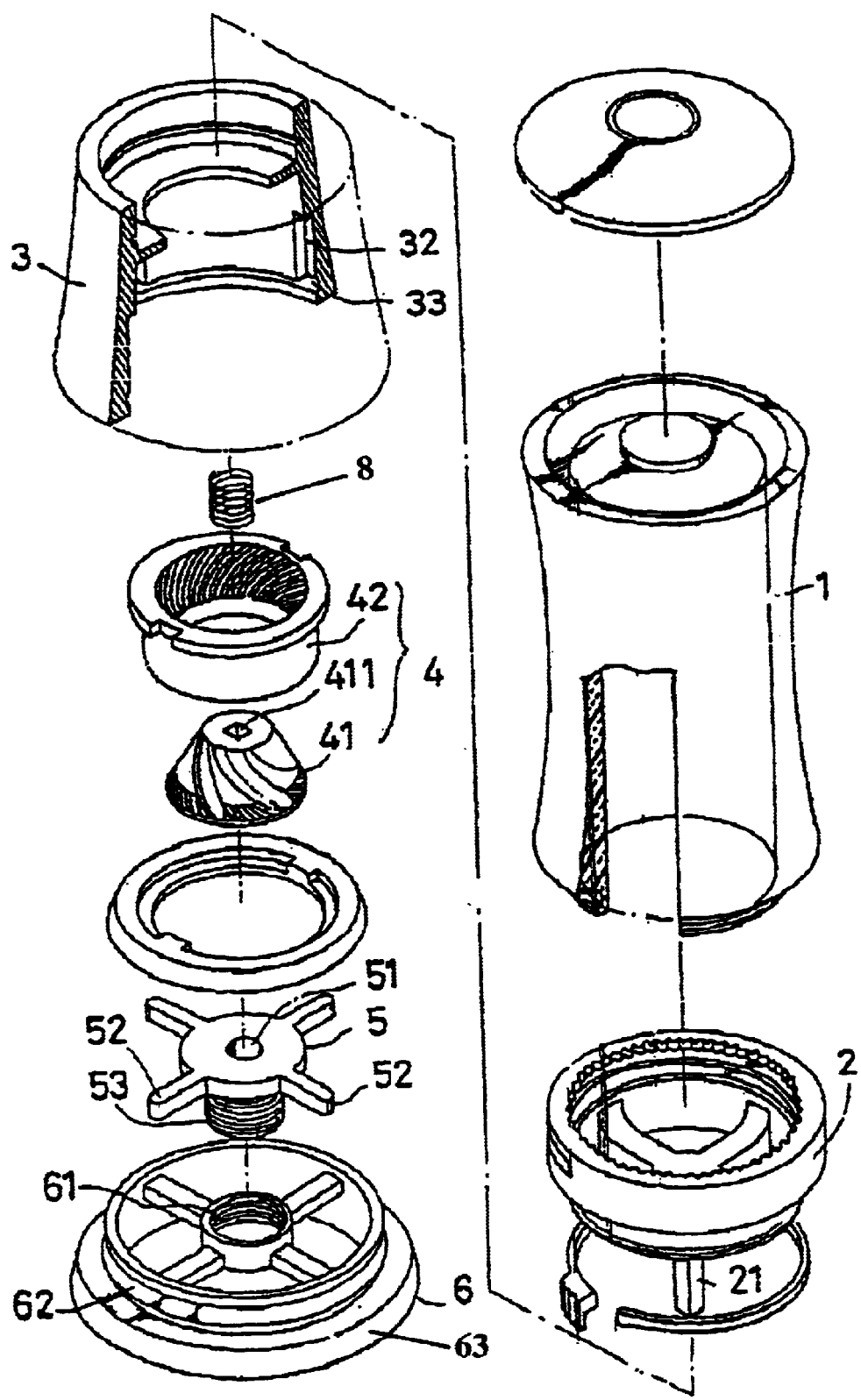
FIG. 1 illustrates an exploded view of a spice mill according to the invention.
Figure 2:
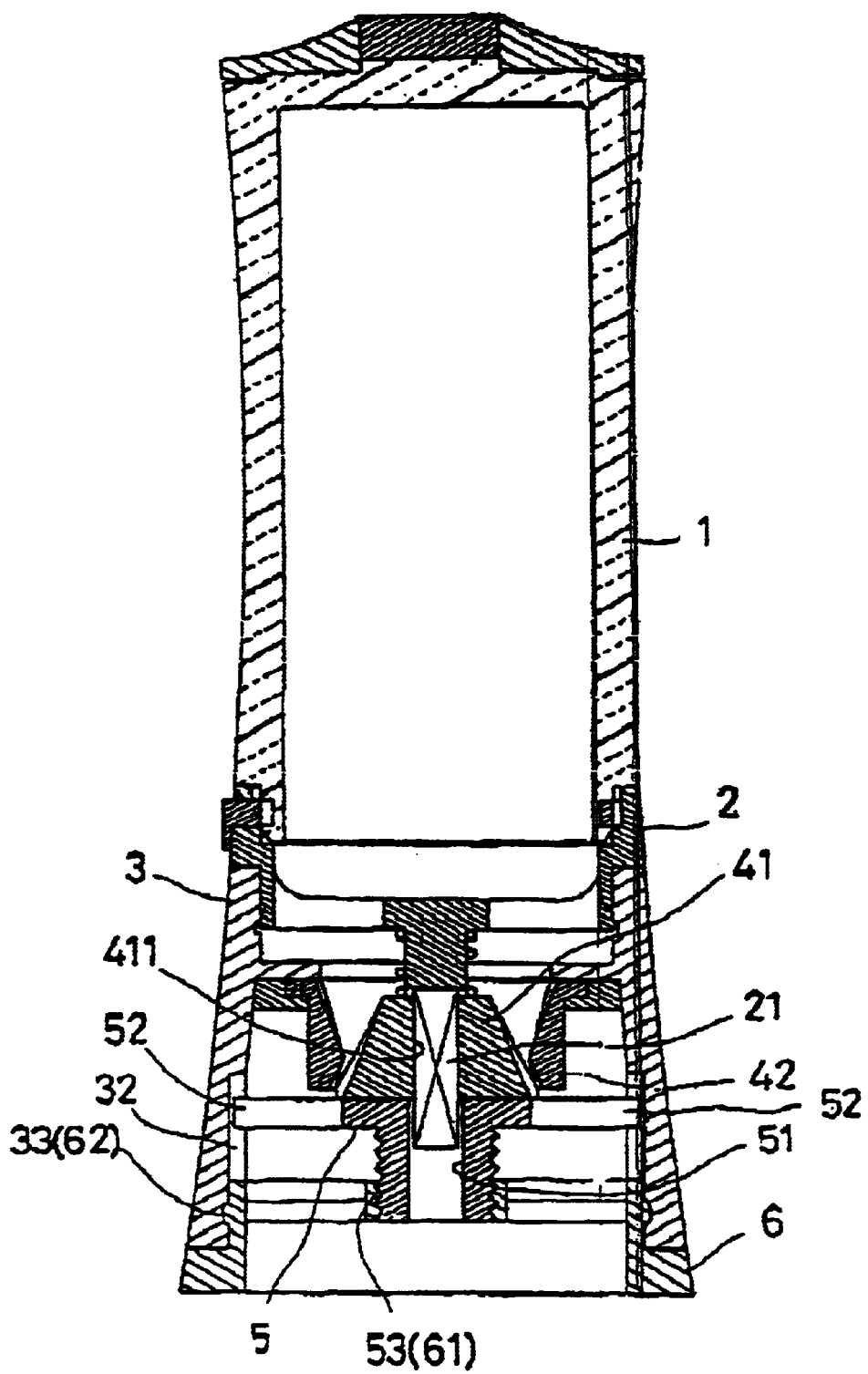
FIG. 2 illustrates a longitudinal section through a spice mill according to FIG. 1 in the assembled condition.

With reference to FIGS. 1 and 2, the inventive spice mill includes a housing 1, a shaft seat 2, a fixed seat 3, a grinding device 4, a lift seat 5 and a rotating seat 6, wherein the housing 1 is a hollow container for accommodating the spice, for example pepper, grains. The lower end of housing 1 is assembled on the shaft seat 2, preferably by means of a screw attachment. Rotary peg 21, which runs downwards from the middle of the shaft seat 2, is polygonal, preferably rectangular, in cross section and is in active connection with inner grinding teeth 41, whereby rotation of housing 1 leads to the rotation of inner grinding teeth 41.

The upper end of fixed seat 3 is rotatably connected, but not axially displaceably connected, to the shaft seat 2. Outer grinding teeth 42 are arranged in the inside of the fixed seat 3. Multiple vertical guide grooves 32 are provided on the inner surface of the fixed seat 3, near to its lower edge. An annular, concave circumferential indentation 33 is provided below the guide grooves 32. This indentation 33 is sized to receive a convex ring, or annular bead, 62 which is provided on the rotatable seat 6.

The grinding device 4 comprises the inner grinding teeth 41 and the outer grinding teeth 42. A continuous bore 411 is provided in the middle of the inner grinding teeth 41. This continuous bore 411 has a rectangular shape and is sized to receive the rotary peg 21. The outer grinding teeth 42 are assembled on the seat 3 in a rotationally fixed manner and are not displaceable in the axial direction. Inner grinding teeth 41 are located on the inside of outer grinding teeth 42.

A central bore 51 is provided in the middle of the lift seat 5. This central bore is aligned with the continuous bore 41, and also receives the rotary peg 21. Multiple spokes 52 run outwards from the periphery of the lift seat 5. Each spoke 52 is allocated to a guide groove 32 of the fixed seat 3 and is received by this guide groove 32 in the assembled condition.

A threaded hollow peg, or tube, 53 extends downward from the outer side of the central bore 51 of the lift seat 5. Hollow peg 53 may be correspondingly screwed into a threaded bore 61 provided in the central part of the rotating seat 6. The outwardly directed convex annular bead 62 is provided on the outer annular wall of the rotating seat 6, and may be correspondingly introduced into the concave ring 33 of the fixed seat 3.

Figure 3:
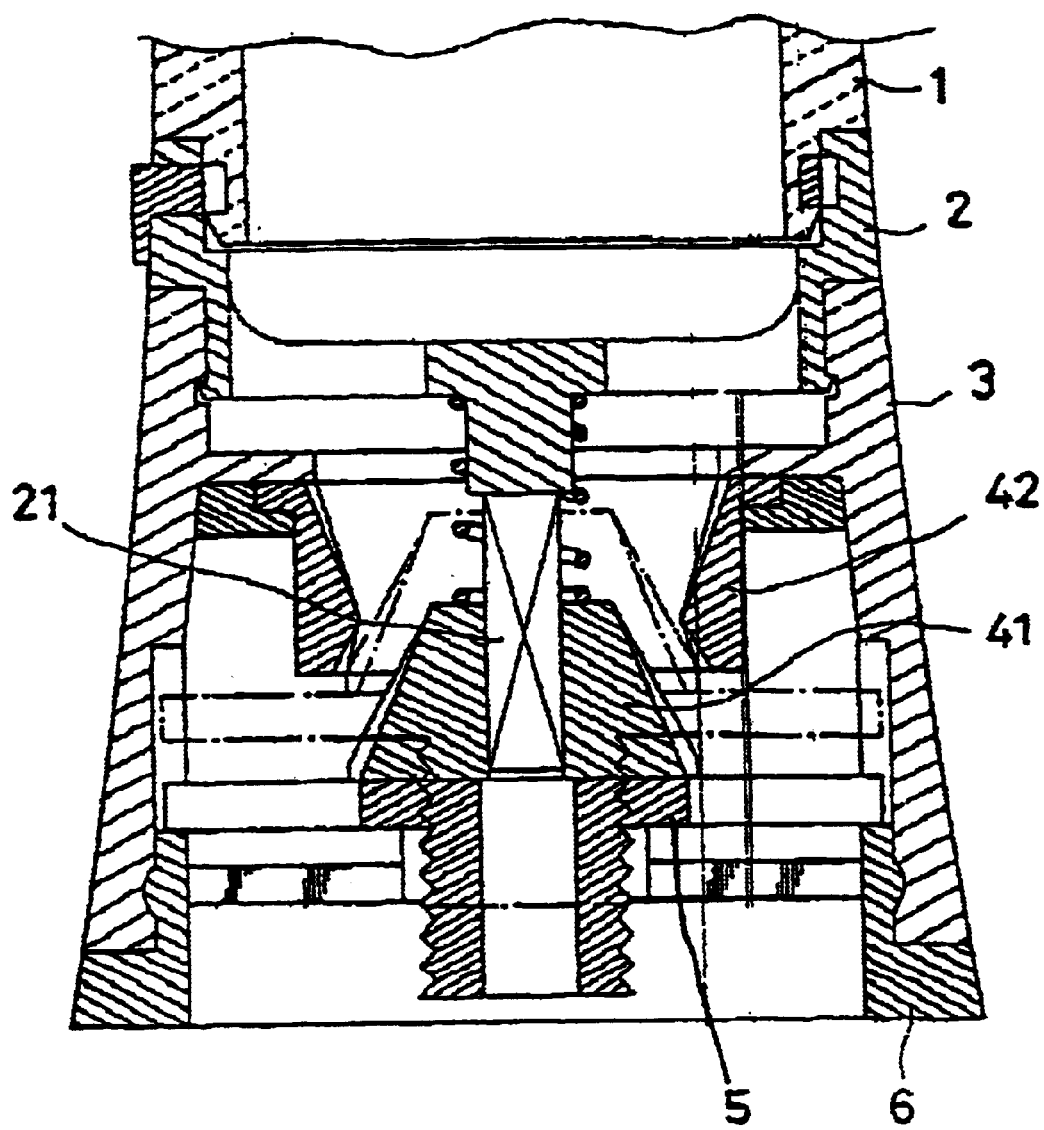
FIG. 3 illustrates a detailed view of the grinding gear and of the adjustment mechanism of the mill according to FIGS. 1 and 2 in the longitudinal section.
Figure 4:
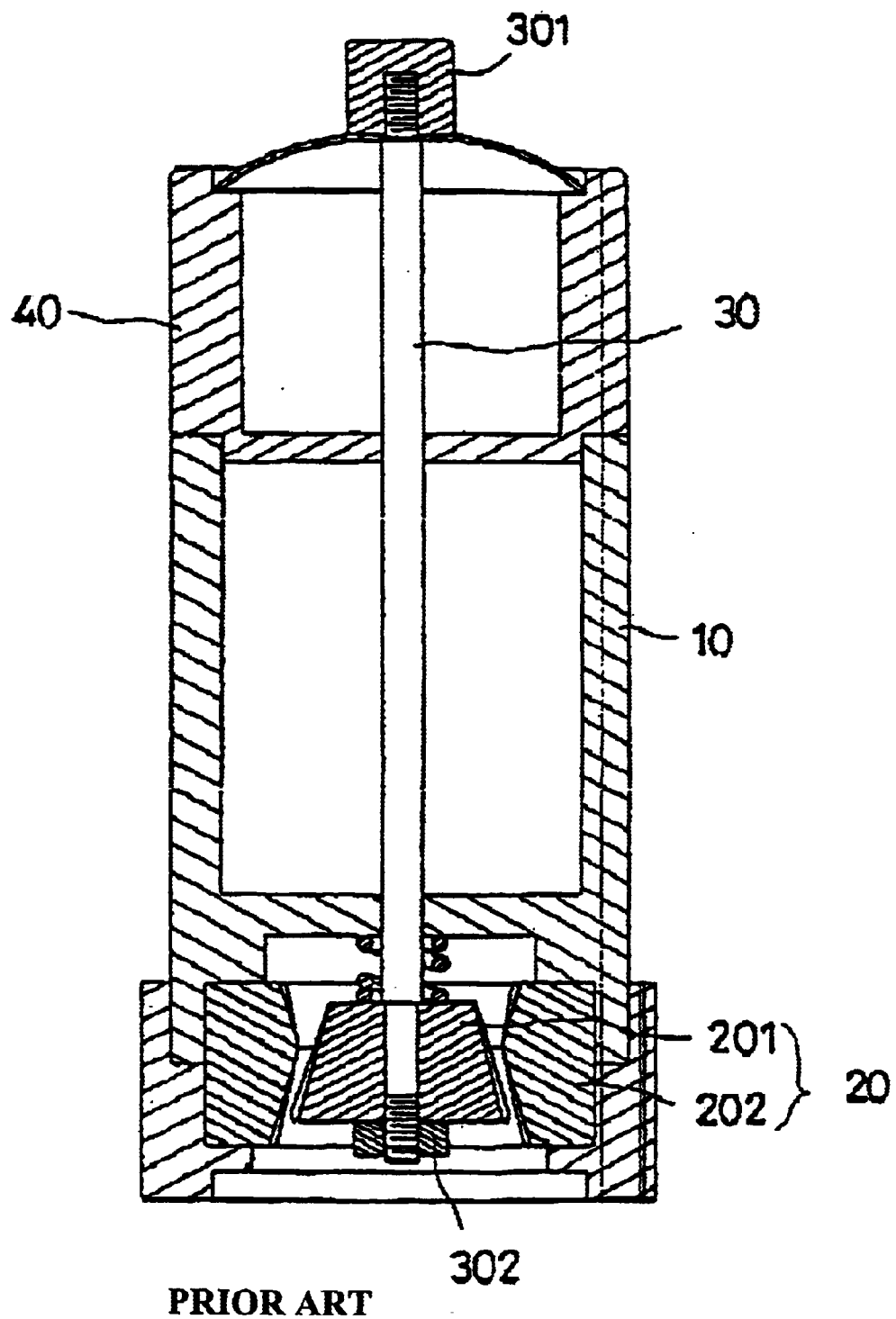
FIG. 4 illustrates a longitudinal section of a conventional spice mill.

As shown in FIG. 3, rotating seat 6, which may rotate in a clockwise or anti-clockwise direction, may be engaged from the outside of the mill. In one embodiment, rotating seat 6 is engaged by means of adjustment ring 63. The position of the rotating seat 6 is fixed in the axial direction. The spokes 52 on the lift seat 5 are guided by way of guide grooves 32 such that they may be moved up and down in the fixed seat 3 within defined limits. When the annular rotating seat 6 is rotated, the lift seat 5 is moved infinitely upwards or downwards along the central axis due to the thread design of the threaded peg 53 on the lift seat 5 and the threaded bore 61 provided in the rotating seat 6. Since the inner grinding teeth 41 are arranged on the lift seat 5, as a result of the lifting and lowering movement of the lift seat 5, the inner grinding teeth 41 are moved upwards or downwards. The inner grinding teeth 41 are pressed downwards onto the lift seat 5 by means of a spring 8. By changing the distance between the inner grinding teeth 41 and the outer grinding teeth 42, an infinite setting of the fineness and the size of the particles produced by grinding is achieved.

Practical trials have shown that the spice mill of the present invention has the following advantages:

1. Since a convex bead and a concave annular groove are provided between the rotating seat 6 and the fixed seat 3, it is ensured that the rotating seat 6 does not move away from the fixed seat 3 whilst it is being rotated.
2. Since the fixed seat 3 is provided with guide grooves for spokes 52 on the lift seat 5, the lift seat 5 is pressed upwards or downwards upon rotation of rotating seat 6, whereby a linear movement of the lift seat 5 is ensured and no deflection is caused.
3. Since the rotating seat 6 may be engaged and rotated from the outside, no complicated manipulation with a small nut dirtied by ground material is required for infinitely setting the grinding fineness.

I claim:

1. A spice mill comprising:
   (a) a housing for holding material to be ground;
   (b) a shaft seat connected to a lower end of the housing, the shaft seat being provided with a rotary peg that projects downwardly from the shaft seat;
   (c) inner grinding teeth having a circular arrangement and displaceably connected to the rotary peg, wherein the inner grinding teeth may be driven in a radial direction by the rotary peg;
   (d) a fixed seat positioned below, and rotatably attached to, the shaft seat;
   (e) outer grinding teeth having a circular arrangement and being positioned in proximity to an outer periphery of the inner grinding teeth, wherein the outer grinding teeth are rigidly held within the fixed seat;
   (f) a lift seat positioned below the inner grinding teeth and provided with a plurality of outwardly extending spokes, each of the plurality of spokes being received by one of a plurality of guide grooves provided on an inner wall of the fixed seat;
   (g) a rotatable seat positioned below and connected to the lift seat whereby rotation of the rotatable seat leads to vertical displacement of the lift seat;
   (h) a convex annular bead arranged on an outer wall of the rotatable seat; and
   (i) a concave annular groove located on an inner wall at a lower end of the fixed seat and being sized to receive the convex annular bead, whereby insertion of the convex annular bead into the concave annular grove results in rotatable connection of the rotatable seat to the fixed seat;

wherein the inner grinding teeth are displaceable in an axial direction relative to the outer grinding teeth by means of the lift seat and the rotatable seat, wherein the lift seat is further provided with a central bore for receiving the rotary peg and a downwardly extending threaded peg that may be screwed into a threaded bore provided in the rotatable seat, wherein the rotatable seat comprises an adjustment ring able to be engaged from an exterior of the mill, wherein rotation of the adjustment ring is transmitted to the threaded bore provided the rotatable seat and, by way of the threaded peg, is converted into an infinite vertical movement of the lift seat along a central axis, and whereby the inner grinding teeth are curved vertically towards or away from the outer grinding teeth to change the fineness of ground particles produced by the mill.

2. The spice mill of claim 1, wherein the inner grinding teeth are pressed downwards onto the lift seat by a spring.

3. The spice mill of claim 1, wherein the inner grinding teeth are provided with a bore for receiving the rotary peg of the shaft seat, and the bore and the rotary peg each have a polygonal cross section.

4. The spice mill of claim 3, wherein the bore and the rotary peg each have a rectangular cross section.

* * * * *